United States Patent
Leslie et al.

(10) Patent No.: US 11,634,893 B2
(45) Date of Patent: Apr. 25, 2023

(54) WEAR MEMBER MONITORING SYSTEM

(71) Applicant: CQMS Pty Ltd, Murarrie (AU)

(72) Inventors: Bruce Alexander Leslie, Goodna (AU); Nicholas Simon Hillier, Goodna (AU)

(73) Assignee: CQMS Pty Ltd, Queensland (AU)

( * ) Notice: Subject to any disclaimer, the term of this patent is extended or adjusted under 35 U.S.C. 154(b) by 1055 days.

(21) Appl. No.: 16/316,822

(22) PCT Filed: Jul. 15, 2016

(86) PCT No.: PCT/AU2016/050631
§ 371 (c)(1),
(2) Date: Jan. 10, 2019

(87) PCT Pub. No.: WO2018/009955
PCT Pub. Date: Jan. 18, 2018

(65) Prior Publication Data
US 2020/0063402 A1     Feb. 27, 2020

(51) Int. Cl.
*E02F 9/28* (2006.01)
*E02F 9/26* (2006.01)
*G01B 11/16* (2006.01)

(52) U.S. Cl.
CPC ............ *E02F 9/2883* (2013.01); *E02F 9/267* (2013.01); *E02F 9/28* (2013.01); *E02F 9/2808* (2013.01); *G01B 11/16* (2013.01)

(58) Field of Classification Search
CPC combination set(s) only.
See application file for complete search history.

(56) References Cited

U.S. PATENT DOCUMENTS

| | | | |
|---|---|---|---|
| 8,411,930 B2 * | 4/2013 | Ridley | G06T 7/0008 382/152 |
| 9,938,693 B1 * | 4/2018 | Reed | G06Q 10/0833 |
| 10,249,060 B2 * | 4/2019 | Wagner | G06T 11/00 |
| 10,339,667 B2 * | 7/2019 | Tafazoli Bilandi | G06V 10/751 |
| 10,504,072 B2 * | 12/2019 | Restum | E02F 3/142 |
| 11,299,870 B2 * | 4/2022 | Kumakura | E02F 9/261 |

(Continued)

FOREIGN PATENT DOCUMENTS

CN        104018545 A     9/2014

OTHER PUBLICATIONS

International Search Report and Written Opinion for PCT/AU2016/050631 dated Aug. 29, 2016; 9 pages.

(Continued)

*Primary Examiner* — Adam J Behrens
(74) *Attorney, Agent, or Firm* — Schwabe, Williamson & Wyatt, PC

(57) ABSTRACT

A wear member monitoring system for a ground engaging tool, the system including: a measuring assembly having: an emitting device configured to emit a measurement signal towards a wear member of the ground engaging tool; a detecting device configured to detect a reflected measurement signal in response to the measurement signal emitted towards the wear member; and a processor configured to: analyse the reflected measurement signal with a two dimensional reference model; and determine a condition of the wear member based on the analysis of the reflected measurement signal with the two dimensional reference model.

21 Claims, 4 Drawing Sheets

(56) References Cited

U.S. PATENT DOCUMENTS

| | | | |
|---|---|---|---|
| 2005/0261799 A1* | 11/2005 | Groth | E02F 3/435 |
| | | | 700/180 |
| 2010/0142759 A1* | 6/2010 | Ridley | E02F 9/2808 |
| | | | 382/107 |
| 2015/0107075 A1* | 4/2015 | Clarke | E02F 9/2891 |
| | | | 29/703 |
| 2015/0149049 A1* | 5/2015 | Bewley | E02F 9/2833 |
| | | | 37/444 |
| 2015/0339810 A1* | 11/2015 | Lim | G06K 9/6215 |
| | | | 382/152 |
| 2016/0129954 A1 | 5/2016 | Hasselbusch | |
| 2016/0244950 A1* | 8/2016 | Kami | E02F 9/262 |
| 2017/0287124 A1* | 10/2017 | Lim | G06T 7/74 |
| 2018/0165884 A1* | 6/2018 | Wagner | E02F 9/26 |
| 2018/0349863 A1* | 12/2018 | Restum | G06Q 10/20 |
| 2019/0010680 A1* | 1/2019 | Hills | E02F 9/26 |
| 2019/0338497 A1* | 11/2019 | Espejo Pina | G01V 3/081 |
| 2020/0240110 A1* | 7/2020 | Takahama | E02F 9/264 |
| 2020/0347579 A1* | 11/2020 | Hama | E02F 9/267 |
| 2021/0131075 A1* | 5/2021 | Kumakura | E02F 9/261 |

OTHER PUBLICATIONS

Luo et al., "Missing Tooth Detection with Laser Range Sensing" 5th World Congress on Intelligent Control and Automation; Jun. 15-19, 2004; pp. 3607-3610, vol. 4; Publication Year: 2004.

* cited by examiner

WEAR MEMBER MONITORING SYSTEM

CROSS-REFERENCE TO RELATED APPLICATION

The present application is a national phase entry under 35 U.S.C. § 371 of International Application No. PCT/AU2016/050631, filed Jul. 15, 2016, the entire disclosure of which is hereby incorporated by reference in its entirety and for all purposes.

FIELD OF THE INVENTION

The invention relates to a wear member monitoring system and method of use. In particular, the invention relates, but is not limited, to a wear member monitoring system and method of use for a ground engaging tool.

BACKGROUND TO THE INVENTION

Reference to background art herein is not to be construed as an admission that such art constitutes common general knowledge in Australia or elsewhere.

Detachment of wear members from, for example, excavator buckets during use reduces productivity and poses other problems on a worksite. By way of example, if a wear member is detached from an excavator bucket, the wear member may damage other equipment on a mining site when it is inadvertently processed by, for instance, a rock crusher. Furthermore, digging with detached wear members is inherently less effective.

In an attempt to avoid the unexpected detachment of wear members, preventative maintenance schedules are employed on worksites. Other technologies have also been proposed for monitoring and reporting the loss of wear members. However, these technologies are typically complex and are not suited to all conditions experienced on, for example, a mining site.

OBJECT OF THE INVENTION

It is an aim of this invention to provide a wear member monitoring system and method of use which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a wear member monitoring system for a ground engaging tool, the system including:
a measuring assembly having:
an emitting device configured to emit a measurement signal towards a wear member of the ground engaging tool;
a detecting device configured to detect a reflected measurement signal in response to the measurement signal emitted towards the wear member; and
a processor configured to:
analyse the reflected measurement signal with a two dimensional reference model; and
determine a condition of the wear member based on the analysis of the reflected measurement signal with the two dimensional reference model.

Preferably, the wear member is in the form of a tooth, adaptor and/or shroud.

Preferably, the measurement signal includes light.

Preferably, the measurement signal includes monochromatic light.

Preferably, the measurement signal includes pulsed light.

Preferably, the emitting device is configured to steer the pulsed light upon transmission. Preferably, the light is steered left, right, up and/or down.

Preferably, the measuring assembly assists in measuring the time-of-flight of a light signal directed towards the wear member.

Preferably, the measuring assembly comprises Laser Illuminated Detection and Ranging (LIDAR).

Preferably, the measuring assembly comprises scannerless LIDAR.

Preferably, the measuring assembly comprises a solid-state LIDAR system.

Preferably, the measurement signal is generated from a laser device. In a further form, the measurement signal is generated from a radar device.

Preferably, the measurement signal is a laser plane.

Preferably, the measurement signal extends in a direction that is substantially perpendicular to a surface of the wear member when the wear member passes through the measurement signal.

Preferably, the measurement signal comprises a plurality of measurement signals.

Preferably, the plurality of measurement signals are in the form of a plurality of laser planes.

Preferably, the plurality of laser planes extend in a transverse direction to each other.

Preferably, the plurality of laser planes are separated by an angle between approximately 0.5 degrees to 3.0 degrees.

Preferably, the plurality of measurement signals extend in a direction that is substantially perpendicular to a surface of the wear member when the wear member passes through the plurality of measurement signals.

Preferably, the detecting device includes a photodetector.

Preferably, the reflected measurement signal is reflected from the wear member.

Preferably, the reflected measurement signal is reflected from a plurality of wear members.

Preferably, the plurality of wear members are arranged substantially symmetrically about an axial axis.

Preferably, the reflected measurement signal includes a reflected light.

Preferably, the reflected measurement signal includes a series of light points along a plane.

Preferably, the reflected measurement signal comprises a plurality of reflected measurement signals.

Preferably, the plurality of reflected measurement signals are in the form of reflected laser planes.

Preferably, the plurality of reflected measurement signals includes reflected lights.

Preferably, the reflected lights form an array of reflected lights.

Preferably, the reflected lights are used to establish one or more point distances.

Preferably, the one or more point distances extend along a plane.

Preferably, the one or more point distances include a distribution of light points in a number of transverse directions.

Preferably, one of the transverse directions is taken relative to the measurement signal and/or reflected measurement signal.

Preferably, the processor is configured to establish a time-of-flight result.

Preferably, the processor is configured to establish the time-of-flight result by comparing the relative phase of the reflected measurement signal with the measurement signal.

Preferably, the processor is configured to establish the time-of-flight result based on a duration of time the reflected measurement signal takes from the wear member and the speed of light.

Preferably, the processor is configured to retrieve a time from when a light pulse is directed towards the wear member, from the emitting device, and is detected by the detecting device as the reflected measurement signal.

Preferably, the processor is configured to establish one or more point distances to the wear member based on the time-of-flight result.

Preferably, the processor is configured to establish a plurality of point distances to the wear member based on the time-of-flight results.

Preferably, the processor is configured to establish point distances for pixels on an image detected by the detecting device.

Preferably, the image is two dimensional.

Preferably, the two dimensional reference model includes an expected reflection input.

Preferably, the expected reflection input is retrieved from a symmetrical operation.

Preferably, the symmetrical operation includes comparing the one or more point distances.

In a further form, the expected reflection input is retrieved from a previous reflected measurement signal.

Preferably, the previous reflected measurement signal is used to establish the one or more point distances to the wear member based on the time-of-flight result(s).

In another form, the expected reflection input is retrieved from a pattern recognition model.

Preferably, the pattern recognition model establishes an expected pattern associated with reflection from the wear member.

Preferably, the expected pattern associated with reflection from the wear member is based on the one or more point distances to the wear member.

Preferably, the expected reflection input is compared with the reflected measurement signal to determine one or more differences therebetween.

Preferably, in response to determining one or more differences in the form of the expected reflection input or alike being absent from the reflected measurement signal, the condition of the wear member is determined to be detached from the ground engaging tool.

For example, the symmetrical operation determines whether the reflected measurement signal, from the plurality of wear members, is substantially symmetrical. In response to the symmetrical operation determining that the reflected measurement signal is unsymmetrical, the condition of one of the wear members of the plurality of wear members is determined to be detached.

Preferably, in response to determining one or more differences in the form of one of the plurality of reflected measurement signals being absent, the condition of the wear member is determined to be at an associated wear state.

For example, if n measurement signals are directed towards the wear member, the pattern recognition model would determine that n reflected measurement signals are expected. In response to receiving n−1 reflected measurement signals, the condition of the wear member is determined to be at an associated wear state.

Preferably, the system further includes a camera. Preferably, the camera records work related to the wear member. Preferably, the camera allows replay to confirm visually when the wear member is detached.

Preferably, the system includes a vehicle identification module. Preferably, the vehicle identification module includes one or more sensors to establish vehicle identification. Preferably, the vehicle identification module uses the processor to undertake a vehicle identification operation.

Preferably, the vehicle identification module allows identification of an associated vehicle when the wear member is detached. That is, preferably the vehicle identification module assists in determining which vehicle the detached wear member may have been delivered to during a delivery operation.

Preferably, the system further includes an alarm. Preferably, the processor is in communication with the alarm such that the alarm notifies a user when the wear member is detached and/or the associated wear state of the wear member is at a predetermined critical wear state.

Preferably, the measurement assembly is configured to obtain digital terrain data. Preferably, the digital terrain data is used as part of digital terrain mapping.

Preferably, the measurement assembly is configured to be used in conjunction with the camera to obtain fragmentation data. Preferably, the fragmentation data relates to spoil associated with the ground engaging tool. Preferably, the fragmentation data relates to spoil size.

In another form the invention resides in a wear member monitoring system for a ground engaging tool, the system including:
  a measuring assembly having:
  an emitting device configured to emit a measurement signal towards a wear member of the ground engaging tool;
  a detecting device configured to detect a reflected measurement signal in response to the measurement signal emitted towards the wear member; and
  a processor configured to:
  establish a time-of-flight result based on the reflected measurement signal or absence thereof;
  analyse the time-of-flight result with a reference model; and
  determine a condition of the wear member based on the analysis of the reflected measurement signal with the time-of-flight result.

Preferably, the reference model includes an expected reflection input.

Preferably, the expected reflection input comprises an expected time-of-flight result.

Preferably, in response to the time-of-flight result being different to the expected time-of-flight result, an associated condition of the wear member is determined.

Preferably, the system is herein as described.

In another form the invention resides in a method for monitoring a wear member of a ground engaging tool, the method including the steps of:
  emitting a measurement signal towards the wear member;
  detecting a reflected measurement signal in response to the measurement signal emitted towards the wear member;
  analysing the reflected measurement signal with a two dimensional reference model; and
  determining a condition of the wear member based on the analysis of the reflected measurement signal with the two dimensional reference model.

Preferably, the wear member is in the form of a tooth, adaptor and/or shroud.

Preferably, the step of emitting the measurement signal towards the wear member includes emitting a plurality of measurement signals.

Preferably, the step of emitting the measurement signal towards the wear member includes generating a laser from a laser device to form the measurement signal.

Preferably, the step of emitting the plurality of measurement signals towards the wear member includes generating a plurality of lasers from the laser device to form the plurality of measurement signals.

Preferably, the laser is in the form of a laser plane. In a further form, the laser plane is directed through mirrors to form the plurality of the plurality of lasers. Preferably, the plurality of lasers are each in the form of laser planes.

Preferably, the step of emitting the measurement signal towards the wear member includes generating light.

Preferably, the step of emitting the measurement signal towards the wear member includes generating a pulsed light.

Preferably, the step of emitting the measurement signal towards the wear member includes steering the pulsed light.

Preferably, the step of emitting the measurement signal towards the wear member includes moving the wear member into a field of view of the measurement signal.

Preferably, the step of emitting the measurement signal towards the wear member includes emitting the measurement signal in a direction that is substantially perpendicular to a surface of the wear member when the wear member passes through the measurement signal.

Preferably, the step of detecting the reflected measurement signal in response to the measurement signal emitted towards the wear member includes detecting the reflected measurement signal from the wear member.

Preferably, the step of detecting the reflected measurement signal in response to the measurement signal emitted towards the wear member includes detecting the reflected measurement signal from a plurality of wear members.

Preferably, the step of detecting the reflected measurement signal in response to the measurement signal emitted towards the wear member includes detecting a plurality of reflected measurement signals.

Preferably, the plurality of reflected measurement signals are each in the form of a reflected light.

Preferably, the plurality of reflected measurement signals are each in the form of a reflected laser plane.

Preferably, the step of analysing the reflected measurement signal with the two dimension model includes retrieving an expected reflection input.

Preferably, the step of analysing the reflected measurement signal with the two dimension model includes retrieving a time-of-flight result.

Preferably, the method further includes establishing one or more point distances to the wear member based on the time-of-flight result.

Preferably, the step of retrieving the expected reflection input includes performing a symmetrical operation.

Preferably, the step of retrieving the expected reflection input includes retrieving a previous reflected measurement signal.

Preferably, the step of retrieving the expected reflection input includes using a pattern recognition model. Preferably, the step of using the pattern recognition model establishes an expected pattern associated with reflection from the wear member.

Preferably, the expected reflection input includes the one or more point distances.

Preferably, the step of analysing the reflected measurement signal with the two dimension model includes comparing the expected reflection input with the reflected measurement signal to determine one or more differences therebetween.

Preferably, in response to determining one or more differences in the form of the expected reflection input or alike being absent from the reflected measurement signal, the condition of the wear member is determined to be detached from the ground engaging tool.

For example, the step of performing the symmetrical operation includes determining whether the reflected measurement signal, from the plurality of wear members, is substantially symmetrical. In response to the symmetrical operation determining that the reflected measurement signal is unsymmetrical, the condition of one of the wear members of the plurality of the wear members is determined to be detached.

Preferably, in response to determining one or more differences in the form of one of the plurality of reflected measurement signals being absent, the condition of the wear member is determined to be at an associated wear state.

For example, the step of using the pattern recognition model includes determining that n reflected measurement signals are expected if n measurement signals are directed at the wear member. In response to receiving n−1 reflected measurement signals, the condition of the wear member is determined to be at an associated wear state.

Preferably, the method further includes the step of recording images of work related to the wear member in order to visually confirm when the wear member is detached.

Preferably, the method further includes the step of identifying a vehicle in order to assist in determining which vehicle the detached wear member may have been delivered to during a delivery operation.

Preferably, the method further includes the step of triggering an alarm when the wear member is detached and/or the associated wear state of the wear member is at a predetermined critical wear state.

Preferably, the method further includes obtaining terrain data with the measurement signal and the reflected measurement signal. Preferably, the method further includes forming a digital terrain map with the terrain data.

Preferably, the method further includes obtaining fragmentation data. Preferably, the fragmentation data relates to spoil size.

In another form the invention resides in a method for monitoring a wear member of a ground engaging tool, the method including the steps of:

emitting a measurement signal towards the wear member;

detecting a reflected measurement signal in response to the measurement signal emitted towards the wear member;

analysing the reflected measurement signal to establish a time-of-flight result; and determining a condition of the wear member based on the analysis of the reflected measurement signal with the time of flight result.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
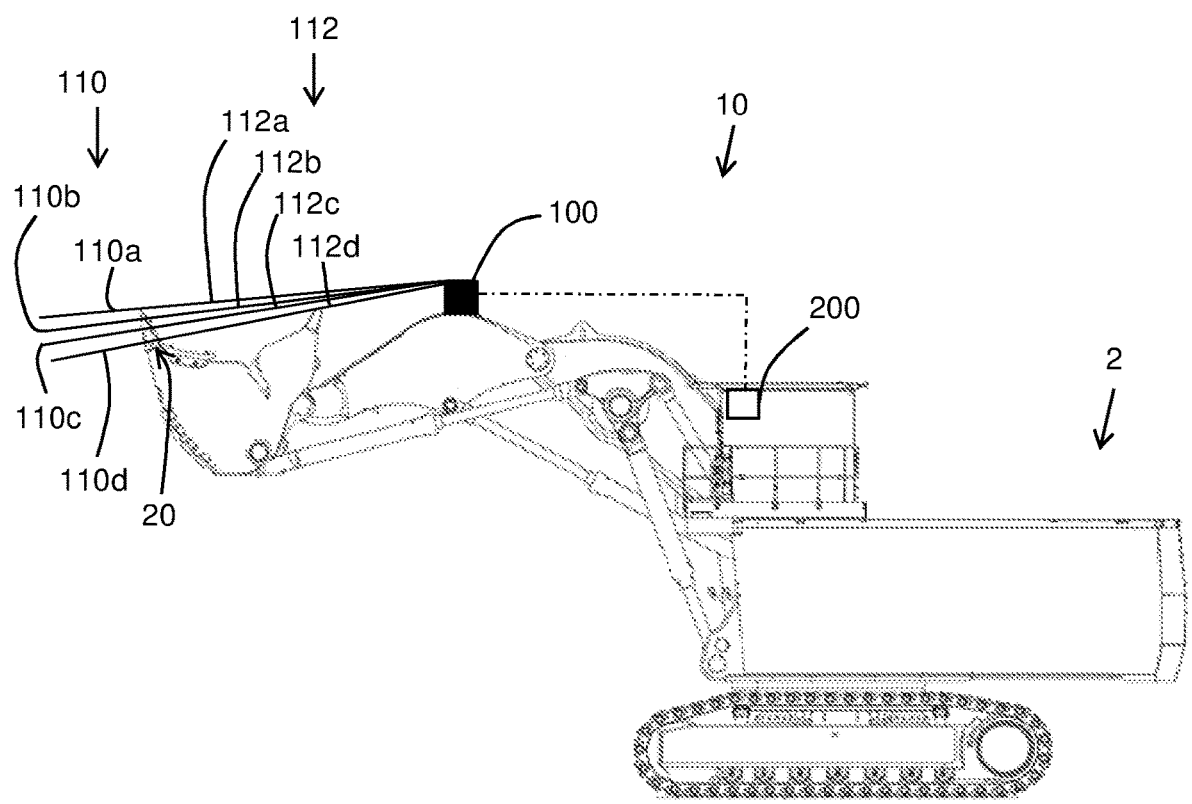
FIG. 1 illustrates a wear member monitoring system for a ground engaging tool, according to an embodiment of the invention.

It is noted that in this disclosure the use of a reference numeral followed by a lower case letter indicates alternative embodiments of a general element identified by the reference numeral. Thus for example a ground engaging tool 20a is similar to but not identical to a ground engaging tool 20b. Further, references to an element identified only by the numeral refer to one or more embodiments of that element. Thus for example a reference to a ground engaging tool 20 may include both the ground engaging tool 20a and the ground engaging tool 20b.

FIG. 1 illustrates a wear member monitoring system 10 for a ground engaging tool 20, according to an embodiment of the invention.

The ground engaging tool 20 in this embodiment forms part of an excavator 2. However, it would be appreciated that the ground engaging tool 20 may, for instance, form part of a wheel loader, back hoe style excavator, shovel style excavator, rope shovel, dragline bucket or alike.

Figure 2:
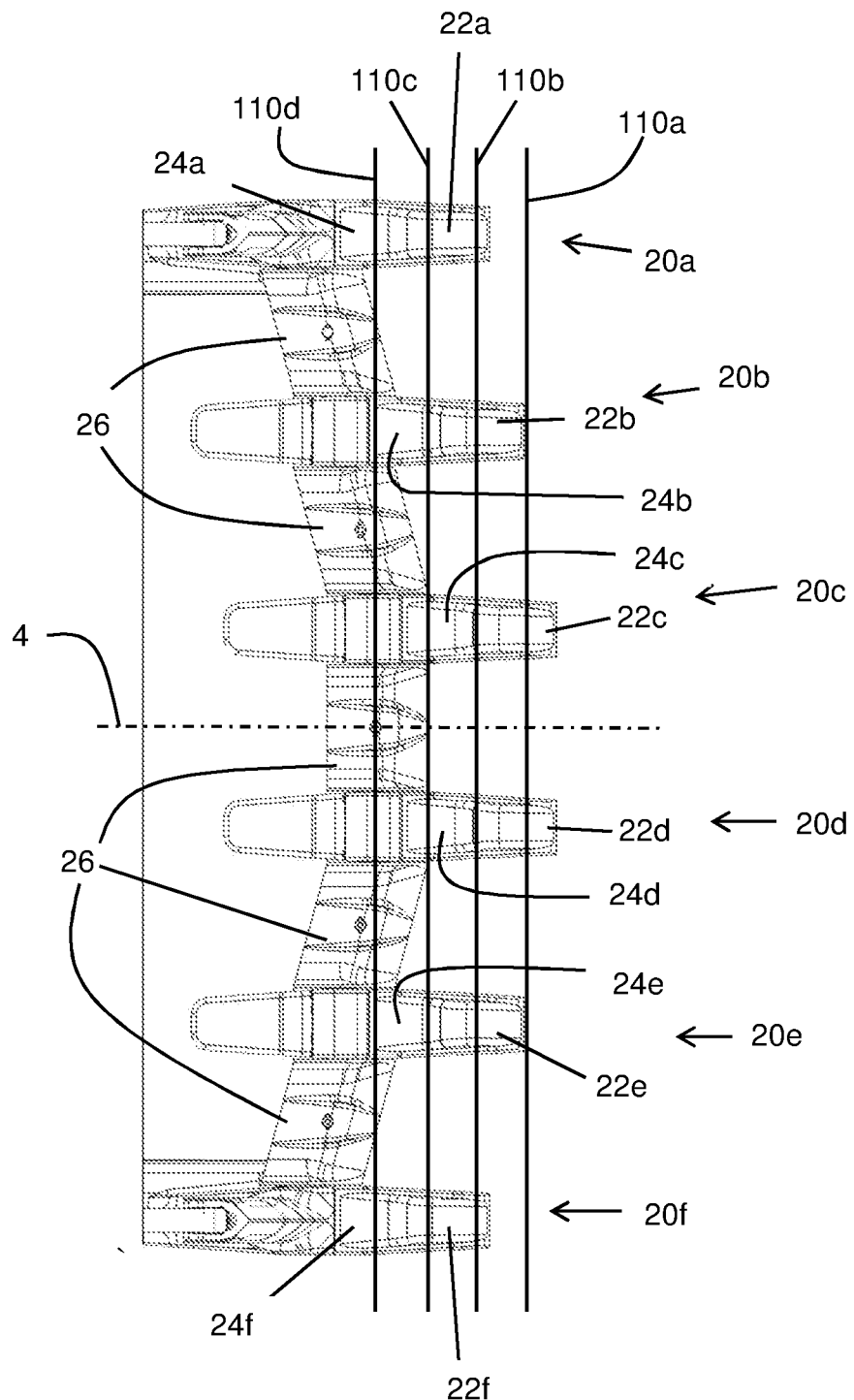
FIG. 2 illustrates a measurement signal of the wear member monitoring system for the ground engaging tool shown in FIG. 1, according to an embodiment of the invention.

As shown more clearly in FIG. 2, a plurality of ground engaging tools 20 (denoted as 20a, 20b, 20c, 20d, 20e, 20f) are located along a bucket of the excavator 2. In this embodiment, the ground engaging tools 20 each include a wear member 22 (denoted as 22a, 22b, 22c, 22d, 22e, 22f respectively) in the form of a tooth and a further wear member 24 (denoted as 24a, 24b, 24c, 24d, 24e, 24f respectively) in the form of an adaptor. It would also be appreciated that, for example, another wear member in the form of shrouds 26 or alike may constitute part of the ground engaging tools 20 along the bucket of the excavator 2. However, attention will be directed towards the wear members 22 and further wear members 24 in this embodiment.

The wear members 22 (i.e. the teeth) are each releasably connected to the further wear member 24 (i.e. the adaptors). The further wear members 24 are each releasably connected to a nose forming part of the excavator 2. The wear members 22, 24 are arranged substantially symmetrical about the axial axis 4.

The wear member monitoring system 10 includes a measuring assembly 100 and a processor 200. The measuring assembly 100 comprises Laser Illuminated Detection and Ranging (LIDAR). In this regard, the measuring assembly 100 comprises an emitting device in the form of a laser device and a detecting device in the form of a photodetector.

However, in further embodiments a measuring assembly 100 using (pulsed) light may be used to assist in establishing time-of-flight results. In particular, the time of flight results may be established by comparing the phase of the measurement signal with the reflected measurement signal. Alternatively, or additionally, the time of flight results may be established by determining a duration of time between the measurement signal and reflected measurement signal.

The laser device is configured to generate a measurement signal in the form of a plurality of laser planes 110 (denoted as 110a, 110b, 110c, 110d) in this embodiment. Although, as would be appreciated from below, part of the present invention may also be performed with one laser plane. The laser planes 110 extend in a transverse direction to each other. That is, the laser planes 110 in this embodiment are separated by an angle of approximately 0.8 degrees but may be further separated.

The measuring assembly 100 is located on an arm of the excavator 2 such that the laser device directs the plurality of laser planes 110 towards the wear members 22, 24. That is, as the bucket of the excavator 2 moves through the laser planes 110, typically during a deliver and return to dig part of a cycle, the laser planes 110 will be reflected off the plurality of wear members 22, 24. Preferably, the laser planes 110 extend in a direction that is substantially perpendicular to a surface of the wear members 22, 24 when the wear members 22, 24 pass through the laser planes 110. However, it would be appreciated that the laser planes 110 may extend in other transverse directions to the surfaces of the wear members 22, 24. In further embodiments, it will also be appreciated that (pulsed) light may be directed towards the wear members 22, 24 in the present invention.

Figure 3:
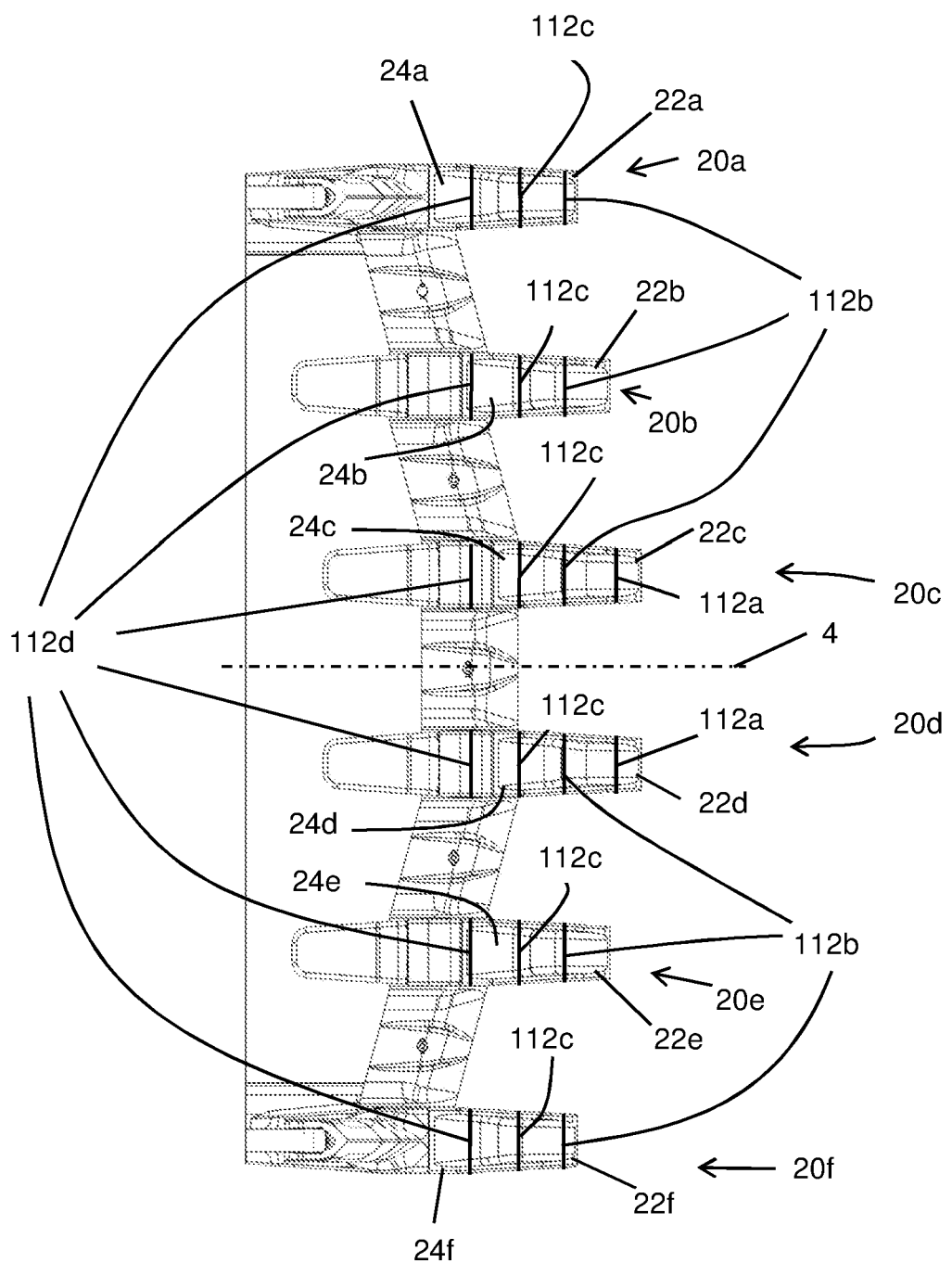
FIG. 3 illustrates a reflected measurement signal of the wear member monitoring system for the ground engaging tool shown in FIG. 1, according to an embodiment of the invention.

In response to the laser planes 110 being emitted towards the wear members 22, 24, FIG. 3 illustrates a reflected measurement signal having a plurality of reflected laser planes 112 (denoted as 112a, 112b, 112c, 112d), according to an embodiment of the invention. In further embodiments, a reflected measurement signal including an array of reflected light may be used in carrying out the present invention.

The reflected laser planes 112 are detected by the photodetector of the measuring assembly 100 and communicated to the processor 200. Similarly, in further embodiments the array of reflected light may be communicated to the processor 200. The processor 200 is in wireless communication with the measuring assembly 100 but, as would be appreciated by a person skilled in the art, the processor 200 may be in wired communication with the measuring assembly 100.

The processor 200 is located in a cabin of the excavator 2. The processor 200 is configured to analyse the reflected measurement signal in the form of the reflected laser planes 112 with a two dimensional reference model. Based on the analysis of the reflected laser planes 112 with the two dimensional reference model, a condition of the wear members 24, 26 may be determined.

With the above in mind, it would also be appreciated that, in a further embodiment, the processor 200 is configured to analyse the reflected measurement signal in the form of the array of reflected light to establish time of flight results. Based on these time-of-flight results, the processor 200 may then determine, for example, a per-pixel distance for the image (i.e. light) received by the detecting device. This in turn creates one or more point distances to the wear member that may be processed by the two dimension reference model below.

The two dimensional reference model includes an expected reflection input. In the present embodiment, the expected reflection input may be retrieved from a symmetrical operation, a previous reflected measurement signal and/or a pattern recognition model.

In response to determining one or more differences in the form of the expected reflection or alike being absent from the reflected measurement signal, as retrieved from the symmetrical operation, the previous reflected measurement signal and/or the pattern recognition model, the condition of the wear member(s) 22, 24 is determined to be detached from the ground engaging tool 20 by the processor 200. That is, for example, if reflected laser planes 112b, 112c associated with wear member 22a are absent, as established from comparison with the previous reflected measurement signal, it would be determined that the wear member 22a is detached. Similarly, if one or more of the point distances to the wear member(s) 22, 24 is absent, as established from comparison with the previous reflected measurement signal, it would be determined that the wear member 22, 24 is detached, Moreover, in response to determining one or more differences in the form of one of the plurality of reflected measurement signals being absent, as obtained from the symmetrical operation, the previous reflected measurement signal and/or the pattern recognition model, the condition of the wear member(s) 22, 24 is determined to be at an associated wear state. For example, if reflected laser plane 112b associated with wear member 22a is absent but laser plane 112c associated with wear member 22a is present, as established from comparison with the pattern recognition model, the condition of the wear member 22a is determined to have at least worn past laser plane 112b. This is outlined further in the method below.

The wear member monitoring system 10 in this embodiment also includes a camera, a vehicle monitoring system and an alarm. The camera is incorporated into the measuring assembly 100 in this embodiment. The camera records work in the form of digging operations or alike related to the wear members 22, 24. On this basis, the camera allows replay to confirm visually when the wear member 22, 24 is detached.

The vehicle identification module includes one or more sensors to establish vehicle identification. In the present context, the vehicle identification module typically establishes the identity of a truck where spoil from the excavator is being dumped or delivered. In this regard, when a wear member 22, 24 is detached, the vehicle identification module assists in determining which vehicle the detached wear member 22, 24 may have been delivered to during a delivery operation.

The processor 200 is in communication with the alarm. In response to a signal from the processor 200, the alarm notifies a user when the wear member 22, 24 is detached and/or the associated wear state of the wear member 22, 24 is at a critical wear state. This is outlined further below.

The measurement assembly 100 is also configured to obtain digital terrain data. This terrain data may be used as part of digital terrain mapping. Furthermore, the measurement assembly 100, in conjunction with the camera, may be used to obtain fragmentation. The fragmentation data relates typically to spoil size (i.e. lumps of dirt).

Figure 4:
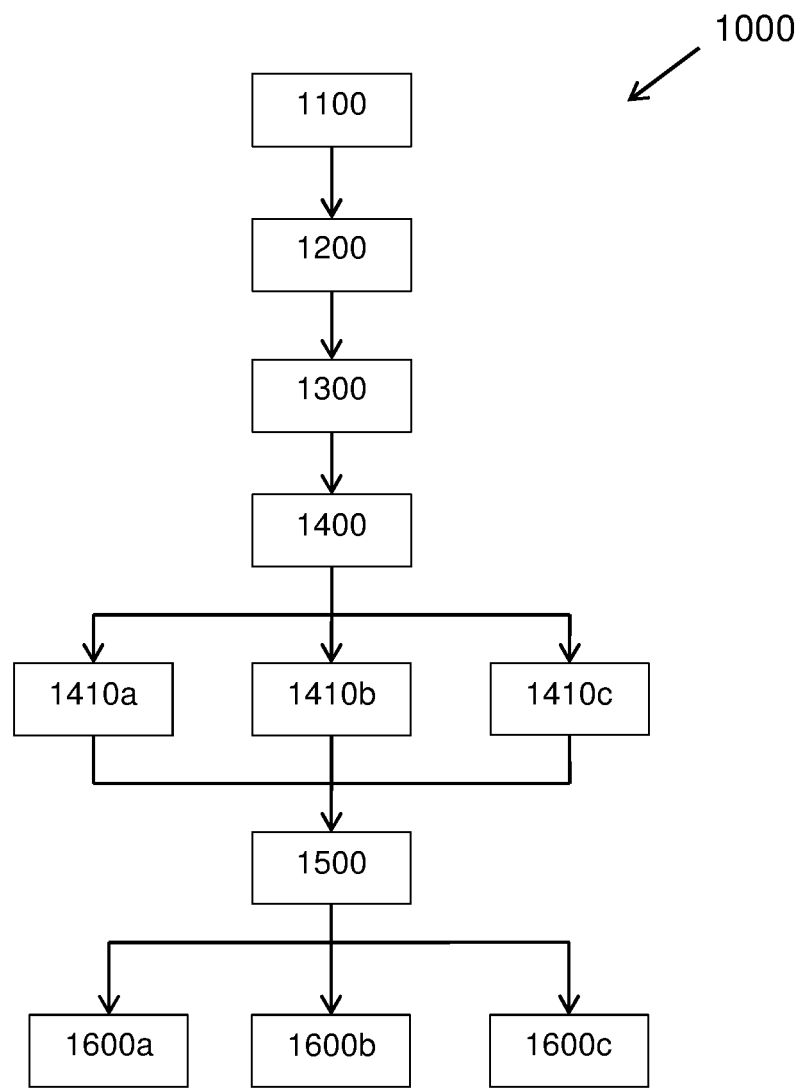
FIG. 4 illustrates a method for monitoring a wear member of a ground engaging tool with reference to FIGS. 1 to 3, according to an embodiment of the invention.

FIG. 4 illustrates a method 1000 for monitoring a wear member 22, 24, 26 of a ground engaging tool 20, according to an embodiment of the invention, with reference to FIGS. 1 to 3.

At step 1100, the excavator 2 takes a scoop of spoil and raises its bucket for delivery to a vehicle in the form of a truck.

At step 1200, as the excavator 2 raises its bucket, the wear members 22, 24 pass transversely though the plurality of laser planes 110, which are emitted from the laser device. The plurality of laser planes 110 are directed towards surfaces of the wear member 22, 24 in a substantially perpendicular direction. It would be appreciated that the shrouds 26, which may be also monitored, also pass transversely through the plurality of laser planes 110 but the present embodiment is directed towards monitoring the wear members 22, 24. Furthermore, in other embodiments using (pulsed) light, it would be appreciated that the wear members 22, 24, 26 will pass through the (pulsed) light when they are in field of view.

At step 1300, the photodetector detects the reflected laser planes 112, as shown in FIG. 3, in response to the laser planes 110 being directed at the wear members 22, 24. In further embodiments, the photodetector may detect reflected light in response to the wear members 22, 24 coming into the field of view of the (pulsed) light from the emitting device.

At step 1400, the processor 200 analyses the reflected laser planes 112 with a two dimensional reference model. The two dimensional reference model includes an expected reflection input. In the present embodiment, the expected reflection input may be retrieved from a symmetrical operation, a previous reflected measurement signal and/or a pattern recognition model. Each of these expected reflection inputs may be used to determine a condition of the wear members at step 1500 and, therefore, are outlined in turn below.

At step 1410a, when the expected reflection input is retrieved from the symmetrical operation, the processor 200 analyses the reflected laser planes 112 to determine whether they are symmetrical about the axial axis 4. For example, the symmetrical operation determines whether reflected laser planes 112a, either side of the axial axis 4 (i.e. associated with wear members 22c, 22d), are received by the photodetector. In further embodiments, it may be determined whether the point distances to the wear members 22, 24, either side of the axial axis 4, are substantially symmetrical.

In the present embodiment, as all of the reflected laser planes 112 are returned and symmetrical about the axial axis 4 in FIG. 3, the wear members 22, 24 are determined to be in a suitable condition at step 1500. However, in response to the symmetrical operation determining that the reflected measurement signal is unsymmetrical, the condition of the related wear members 22, 24 is determined to be detached and/or at an associated wear state at step 1500.

For example, if reflected lasers 112b, 112c related to wear member 22f do not have corresponding reflected lasers on the opposite side of axial axis 4, it can be determined that the condition of the wear member 22a is detached at step 1500. Similarly, if reflected laser 112b related to wear member 22f does not have a reflected laser 112b on the opposite side of axial axis 4, it can be established that the wear member 22a has worn past the reflected laser plane 112b associated therewith. It can therefore be determined that the condition of the wear member 22a is at this associated wear state at step 1500.

At step 1410b, when the expected reflection input is retrieved from the previous reflected measurement signal, the processor 200 analyses the reflected laser planes 112 by comparing them with a previous reflected measurement signal that represents when the wear members 22, 24 are in a suitable condition (i.e. neither detached nor substantially worn).

In the present embodiment, as all the reflected laser planes 112 in FIG. 3 would substantially match the previous reflected signal, as the wear members 22, 24 in FIG. 3 are not detached nor substantially worn, the wear members 22, 24 are determined to be in a suitable condition at step 1500.

If, however, reflected laser planes 112b, 112c were not received from wear member 22a, as established from the comparison with the previous reflected signal, it can be determined that the condition of the wear member 22a is detached at step 1500. Similarly, if reflected laser plane 112b was not received from wear member 22a, it can be established from the comparison with the previous reflected signal that the wear member 22*a* has worn past the reflected laser plane 112*b* associated therewith. It can therefore be determined that the condition of the wear member 22*a* is at this associated wear state at step 1500. Using the point distances to the wear members 22, 24 in a similar manner also allow the processor 200 to determine whether the wear member 22, 24 is detached and/or worn to a particular state.

At step 1410*c*, when the expected reflection input is retrieved from the pattern recognition model, the processor 200 analyses the reflected laser planes 112 by comparing them with an expected pattern associated with reflection from the wear members 22, 24. In the present embodiment, the expected pattern is established on the basis of the number of laser planes 110 directed at the wear members 22, 24, the location of the wear members 22, 24 and the expected number of reflected laser planes 112 to be detected by the photodetector. In further embodiments, the expected pattern may be established by, for instance, the per-pixel distance of the image (i.e. light) received by the detecting device regarding the wear members 22, 24.

With regard to the present embodiment, three reflected laser planes 112*b*, 112*c*, 112*d* are expected from the wear members 22*a*, 24*a*. Accordingly, as all the reflected laser planes 112 in FIG. 3 would substantially match the expected pattern, as the wear members 22, 24 in FIG. 3 are not detached nor substantially worn, the wear members 22, 24 are determined to be in a suitable condition at step 1500.

If, however, reflected laser planes 112*b*, 112*c* were not received from wear member 22*a*, as established from the comparison with the expected pattern, it can be determined that the condition of the wear member 22*a* is detached at step 1500. Similarly, if reflected laser plane 112*b* was not received from wear member 22*a*, it can be established from the expected pattern that the wear member 22*a* has worn past the reflected laser plane 112*b* associated therewith. It can therefore be determined that the condition of the wear member 22*a* is at this associated wear state at step 1500.

Whilst the wear members 22, 24 are determined to be in a suitable condition in the present embodiment, in the case that a wear member 22, 24 is determined to be detached or at an associated wear state that is considered critical (i.e. likely to fail and/or required replacement), an alarm is triggered to alert a user of the condition of the wear member 22, 24 at step 1600*a*. This alarm may be communicated visually or audible to the user.

Similarly, at step 1600*b*, in the case that a wear member 22, 24 is determined to be detached, the vehicle identification module assists in determining which vehicle the detached wear member 22, 24 may have been delivered to during a delivery operation.

Moreover, at step 1600*c*, in the case that a wear member 22, 24 is determined to be detached, the recorded images from the camera may be used to visually confirm when the wear member 22, 24 is detached.

The wear member monitoring system 10 and method 1000 provides a simple solution for detecting lost wear members 22, 24, 26. This increases productivity as digging with detached wear members is inherently less effective. Furthermore, identifying when a wear member 22, 24, 26 is detached allows for quick recovery of the wear member 22, 24, 26 avoiding other potential problems on a worksite (e.g. a wear member being processed through a rock crusher).

The wear member monitoring system 10 and method 1000 also allows the monitoring of wear for the wear members 22, 24, 26. Accordingly, as part of a preventative maintenance regime, wear members 22, 24, 26 may be replaced when they reach a predetermined critical wear state in order to avoid unscheduled downtime.

In addition, the laser planes 110 are suited to mining applications and alike. Similarly, it would be appreciated that the use of (pulsed) light to establish time-of-flight results in the present invention is suited to mining applications and alike and provides a further option in determining the condition of the wear members 22, 24, 26.

Moreover, the system 10 and associated method of use may obtain digital terrain data that forms part of a digital terrain map. Furthermore, fragmentation data may be obtained with the measurement assembly 100 and camera. This adds further versatility to the system 10 and associated method of use.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A wear member monitoring system for a ground engaging tool, the system including:
    a measuring assembly having:
        an emitting device configured to emit a measurement signal towards a wear member of the ground engaging tool;
        a detecting device configured to detect a reflected measurement signal in response to the measurement signal emitted towards the wear member; and
    a processor configured to:
        analyse the reflected measurement signal with a two dimensional reference model; and
        determine a condition of the wear member based on the analysis of the reflected measurement signal with the two dimensional reference model;
    wherein the measurement signal comprises a plurality of measurement signals in the form of a plurality of laser planes that extend in a transverse direction to each other.

2. The system of claim 1, wherein the two dimensional reference model includes an expected reflection input.

3. The system of claim 2, wherein the expected reflection input is retrieved from a symmetrical operation.

4. The system of claim 2, wherein the expected reflection input is retrieved from a previous reflected measurement signal.

5. The system of claim 2, wherein the expected reflection input is retrieved from a pattern recognition model that establishes an expected pattern associated with reflection from the wear member.

6. The system of claim 2, wherein the expected reflection input is compared with the reflected measurement signal to determine one or more differences therebetween.

7. The system of claim 6, wherein in response to determining the one or more differences is in the form of the expected reflection input being absent from the reflected measurement signal, the condition of the wear member is determined to be detached from the ground engaging tool.

8. The system of claim 6, wherein the reflected measurement signal comprises a plurality of reflected measurement signals and in response to determining that the one or more differences is in the form of one of the plurality of reflected measurement signals being absent, the condition of the wear member is determined to be at an associated wear state.

9. The system of claim 1, wherein the measuring assembly comprises Laser Illuminated Detection and Ranging (LIDAR).

10. The system of claim 1, wherein the measurement signal extends in a direction that is substantially perpendicular to a surface of the wear member as the wear member passes through the measurement signal.

11. The system of claim 1, wherein a camera allows replay to confirm visually when the wear member is detached.

12. The system of claim 1, wherein a vehicle identification module includes one or more sensors to establish vehicle identification.

13. The system of claim 12, wherein the vehicle identification module allows identification of an associated vehicle when the wear member is detached.

14. The system of claim 1, wherein the processor is in communication with an alarm such that the alarm notifies a user when the wear member is detached and/or the wear member is at a predetermined critical wear state.

15. The system of claim 1, wherein the measurement assembly is configured to obtain digital terrain data.

16. The system of claim 1, wherein in order to analyse the reflected measurement signal with the two dimensional reference model the processor is configured to establish one or more point distances to the wear member based on one or more time-of-flight results.

17. A method for monitoring a wear member of a ground engaging tool, the method including the steps of:
 emitting a measurement signal towards the wear member;
 detecting a reflected measurement signal in response to the measurement signal emitted towards the wear member;
 analysing the reflected measurement signal with a two dimensional reference model; and
 determining a condition of the wear member based on the analysis of the reflected measurement signal with the two dimensional reference model;
 wherein the measurement signal comprises a plurality of measurement signals in the form of a plurality of laser planes that extend in a transverse direction to each other.

18. The method of claim 17, wherein the step of emitting the measurement signal towards the wear member includes moving the wear member into a field of view of the measurement signal.

19. The method of claim 17, wherein the method further includes a step of identifying a vehicle in order to assist in determining which vehicle a detached wear member has been delivered to during a delivery operation.

20. The system of claim 1, wherein the wear member is in the form of a tooth, adaptor and/or shroud.

21. The system of claim 1, wherein the measurement signal includes pulsed light.

\* \* \* \* \*